(12) United States Patent
Zhang et al.

(10) Patent No.: US 6,510,725 B2
(45) Date of Patent: Jan. 28, 2003

(54) APPARATUS AND METHOD OF INSPECTING GAGE

(75) Inventors: Yuwu Zhang, Kawasaki (JP); Masaoki Yamagata, Kawasaki (JP); Yoichi Toida, Kawasaki (JP); Shiro Igasaki, Kawasaki (JP); Eiichi Tsunoda, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/974,346

(22) Filed: Oct. 10, 2001

(65) Prior Publication Data

US 2002/0046005 A1 Apr. 18, 2002

(30) Foreign Application Priority Data

Oct. 13, 2000 (JP) .................................. 2000-313894
Oct. 17, 2000 (JP) .................................. 2000-316319

(51) Int. Cl.[7] ............................................. G01B 21/02
(52) U.S. Cl. ......................................................... 73/1.79
(58) Field of Search ............................. 73/1.79; 33/502, 33/503

(56) References Cited

U.S. PATENT DOCUMENTS 3,792,615 A * 2/1974 MacIntyre et al. ............. 74/44
4,771,237 A * 9/1988 Daley ........................... 324/202
5,691,841 A * 11/1997 Ohsaki et al. ............... 359/391
5,781,450 A * 7/1998 Glasson ....................... 364/560
6,070,068 A * 5/2000 Sudo ........................... 455/414
6,085,581 A * 7/2000 Jones et al. ................... 73/105

FOREIGN PATENT DOCUMENTS

JP 63-91508 4/1988

* cited by examiner

Primary Examiner—Hezron Williams
Assistant Examiner—C D Garber
(74) Attorney, Agent, or Firm—Rankin, Hill, Porter & Clark LLP

(57) ABSTRACT

A gage inspecting apparatus includes a jog dial 56A for controlling an amount of displacement of a measuring spindle 22 at a time when the position of the measuring spindle 22 is finely adjusted, and a shuttle ring 56B for controlling the driving direction and driving speed of the measuring spindle 22 at a time when the position of the measuring spindle 22 is roughly adjusted. The relationship between the amount of rotation of the jog dial 56A and the amount of displacement of the measuring spindle 22 can be set in correspondence with a scale interval of the gage.

17 Claims, 12 Drawing Sheets

APPARATUS AND METHOD OF INSPECTING GAGE

BACKGROUND OF THE INVENTION

1. Field of the Invention

The present invention relates to a gage inspecting apparatus and a gage inspecting method for inspecting the indication accuracy of an object to be inspected by an indicated value of the object to be inspected when a measuring spindle which is made to abut against a probe of the object to be inspected is displaced to a predetermined position. In particular, the present invention relates to a gage inspecting apparatus and a gage inspecting method excelling in operational efficiency and suitable for use in the inspection of various indicators including dial gages, lever type dial indicators, microindicators, digital type indicators, and the like.

2. Description of the Related Art

In recent years, the numbers of dial gages and the like used in manufacturing companies are on an ever-increasing trend. The reason for this is that in addition to the conventional method in which dial gages and the like are used as general-purpose comparators, cases are increases in which the dial gages or the like are used for the purpose of continuously measuring the acceptability of workpieces by attaching the dial gages to exclusive-use measuring jigs or the like.

Incidentally, in the control of dial gages and the like, inspection methods have been standardized in the International Organization for Standardization (ISO), the Japanese Industrial Standards (JIS), the American National Standards Institute (ANSI), or the Deutsche Industrie-Normen (DIN). For this reason, in conventional apparatuses for inspecting dial gages and the like, inspection methods based on ISO, JIS, ANSI or DIN standards are programmed in advance. An inspecting apparatus which makes it possible to perform the inspection of dial gages and the like in accordance with such a program has been developed (e.g., Japanese Patent Unexamined Publication No. Sho. 63-91508).

When the inspection of dial gages and the like is carried out by using such an inspecting apparatus, a measuring spindle of the inspecting apparatus is first driven to respective measurement positions. Then, readings on the gage and readings on the inspecting apparatus are inputted, and "the reading on the gage minus the reading on the inspecting apparatus" at the respective measurement position is conventionally set as the indication accuracy at the corresponding measurement position.

Conventionally, however, since the micrometer head, for example, is manually moved to displace the measuring spindle, the operation has involved time and trouble. In particular, there has been a problem in that it takes time in the movement between measurement positions.

To overcome such a problem, as a semiautomatic inspection apparatus for driving the measuring. spindle by a motor, it is conceivable to automatically position the measuring spindle just short of a measurement target position by using a personal computer. However, in a case where the feeding speed of the measuring spindle is fixed irrespective of the scale interval of gages to be inspected, at the time of the spindle operation in the setup of inspection for executing the rough positioning of a reference position of measurement (an initial measurement position, e.g., a zero point) after the mounting of the gage on the inspecting apparatus, it is impossible to obtain satisfactory operational efficiency for both gages having large scale intervals and gages having small scale intervals since the scale interval of the gage is not reflected on the feeding speed of an operating button.

In addition, in a case where the moving direction of the measuring spindle is constantly set reversible irrespective of the present measuring direction (e.g., from a small value to a large value, or from a large value to a small value), there are cases where the movement in a direction opposite to the measuring direction occurs due to the erroneous operation of an operating knob. This is not allowed during the measurement during which scale adjustment to the measurement position is being effected, so as to prevent the hysteresis of the gage. Accordingly, in such a case, there has been a problem is that there are cases where the measurement must be retried from the beginning.

In addition, at the time of inspecting the indication accuracy or repetitive accuracy of the dial gage, it is necessary to drive the measuring spindle so that the hysteresis of the gage is not included in the result of measurement in accordance with the inspection standard.

To ensure that the hysteresis of the gage is not included in the result of measurement, it is sufficient to drive the measuring spindle only in a predetermined direction (which will be referred to as the measuring direction). However, when an operator adjusts the needle of the gage to the scale at a measurement target position, there are cases where the needle of the gage overshoots the scale at the measurement target position due to an operation error. In such a case, it is necessary to carry out the measurement for the relevant position once again after the measuring spindle is retracted by a distance greater than that corresponding to the value of the hysteresis of the gage. However, there have been problems in that the automatic positioning using a personal computer cannot be made use of, and that an increase in the inspection time and the operator's fatigue are entailed.

In addition, in the case of the semiautomatic inspecting apparatus, the operator's operation error (operation error in scale adjustment) is unavoidable, so that remeasurement for a measurement point which has been measured is required. In addition, if the result of measurement was poor, since there are cases where it is impossible to distinguish whether the poor result of measurement was due to a measurement error or the accuracy of the gage, remeasurement for the measurement point which has been measured becomes necessary for the sake of confirmation.

However, in the event that the operator is late in becoming aware that there has been a measurement error in the measurement data which has been measured, all the data need to be measured once again from the beginning by invalidating all the multiplicity of pieces of measured data. Accordingly, there has been a problem in that an increase in the inspection time and the operator's fatigue are entailed.

SUMMARY OF THE INVENTION

Accordingly, it is a first object of the invention to provide a gage inspecting apparatus and a gage inspecting method excelling in the operational efficiency, thereby overcoming the above-described problems of the conventional art.

A second object of the invention is to facilitate the retrial of the present measurement.

A third object of the invention is to facilitate the remeasurement of the result of immediately previous measurement.

A fourth object of the invention is to facilitate the remeasurement of the result of measurement of an arbitrary point among a multiplicity of pieces of measured data.

To attain the above-described first object, a gage inspecting apparatus, in accordance with a first aspect of the invention, detects the indication accuracy of an object to be inspected on the basis of an indicated value of the object to be inspected at a time when a measuring spindle which is made to abut against a probe of the object to be inspected is displaced to a predetermined position.

The gage inspecting apparatus comprises a jog dial for controlling an amount of displacement of the measuring spindle at a time when the position of the measuring spindle is finely adjusted, and a shuttle ring for controlling the driving direction and driving speed of the measuring spindle at a time when the position of the measuring spindle is roughly adjusted.

In addition, in the above-described gage inspecting apparatus, the relationship between the amount of rotation of the jog dial and the amount of displacement of the measuring spindle can be set in correspondence with a scale interval of the gage.

In addition, in the above-described gage inspecting apparatus, the driving direction of the measuring spindle is controlled in correspondence with the direction of rotation of the shuttle ring from an intermediate position thereof, and the measuring spindle is driven at a speed proportional to an angle of rotation from the intermediate position of the shuttle ring.

In addition, in the above-described gage inspecting apparatus, there are provided a high speed mode which is independent of the scale interval of the gage and in which the measuring spindle is displaced by a large amount by a small amount of rotation of the jog dial and a maximum driving speed of the measuring spindle can be set by the shuttle ring, and a low speed mode which is dependent of the scale interval of the gage and in which the measuring spindle is displaced by a small amount by a large amount of rotation of the jog dial and the maximum driving speed of the measuring spindle cannot be set even by a maximum angle of rotation of the shuttle ring.

In addition, in the above-described gage inspecting apparatus, a changeover is freely possible between the high speed mode and the low speed mode at the time of the setup of inspection, and, during measurement, the jog dial is fixed to the low speed mode, and an instruction for displacing the jog dial in an opposite direction to a measuring direction and an instruction based on the shuttle ring are made invalid.

To attain the above-described second object, a gage inspecting apparatus, in accordance with a second aspect of the invention, detects the indication accuracy of an object to be inspected on the basis of an indicated value of the object to be inspected at a time when a measuring spindle which is made to abut against a probe of the object to be inspected is displaced to a predetermined position. The gage inspecting apparatus comprises: a retry instructing unit for instructing the retrial of the present measurement, and an automatic positioning unit which when the retrial has been instructed, causes the measuring spindle to be temporarily retracted to a position where the hysteresis of the object to be inspected can be avoided, and causes the measuring spindle to be subsequently advanced forwardly to a position located immediately in front of a present measurement target position.

To attain the above-described third object, a gage inspecting apparatus, in accordance with a third aspect of the invention, detects the indication accuracy of an object to be inspected on the basis of an indicated value of the object to be inspected at a time when a measuring spindle which is made to abut against a probe of the object to be inspected is displaced to a predetermined position. The gage inspecting apparatus comprises: a cancellation instructing unit for instructing the deletion of a result of immediately previous measurement, and an automatic positioning unit which when the cancellation has been instructed, causes the measuring spindle to be temporarily retracted to a position where the hysteresis of the object to be inspected can be avoided, and causes the measuring spindle to be subsequently advanced forwardly to a position located immediately in front of a measurement target position of an immediately previous measurement point.

To attain the above-described fourth object, a gage inspecting apparatus, in accordance with a fourth aspect of the invention, detects the indication accuracy of an object to be inspected by means of an indicated value of the object to be inspected at a time when a measuring spindle which is made to abut against a probe of the object to be inspected is displaced to a predetermined position. The gage inspecting apparatus comprises: a remeasurement instructing unit for instructing the remeasurement of a measured result of measurement, and an automatic positioning unit which when the remeasurement has been instructed, causes the measuring spindle to be temporarily retracted to a position where the hysteresis of the object to be inspected can be avoided, and causes the measuring spindle to be subsequently advanced forwardly to a position located immediately in front of a measurement target position In addition, in the above-described gage inspecting apparatus, the retraction distance and the forwardly approaching distance by the automatic positioning unit can be designated.

DESCRIPTION OF THE PREFERRED EMBODIMENTS

Referring now to the accompanying drawings, a detailed description will be given of an embodiment of the invention.

Figure 1:
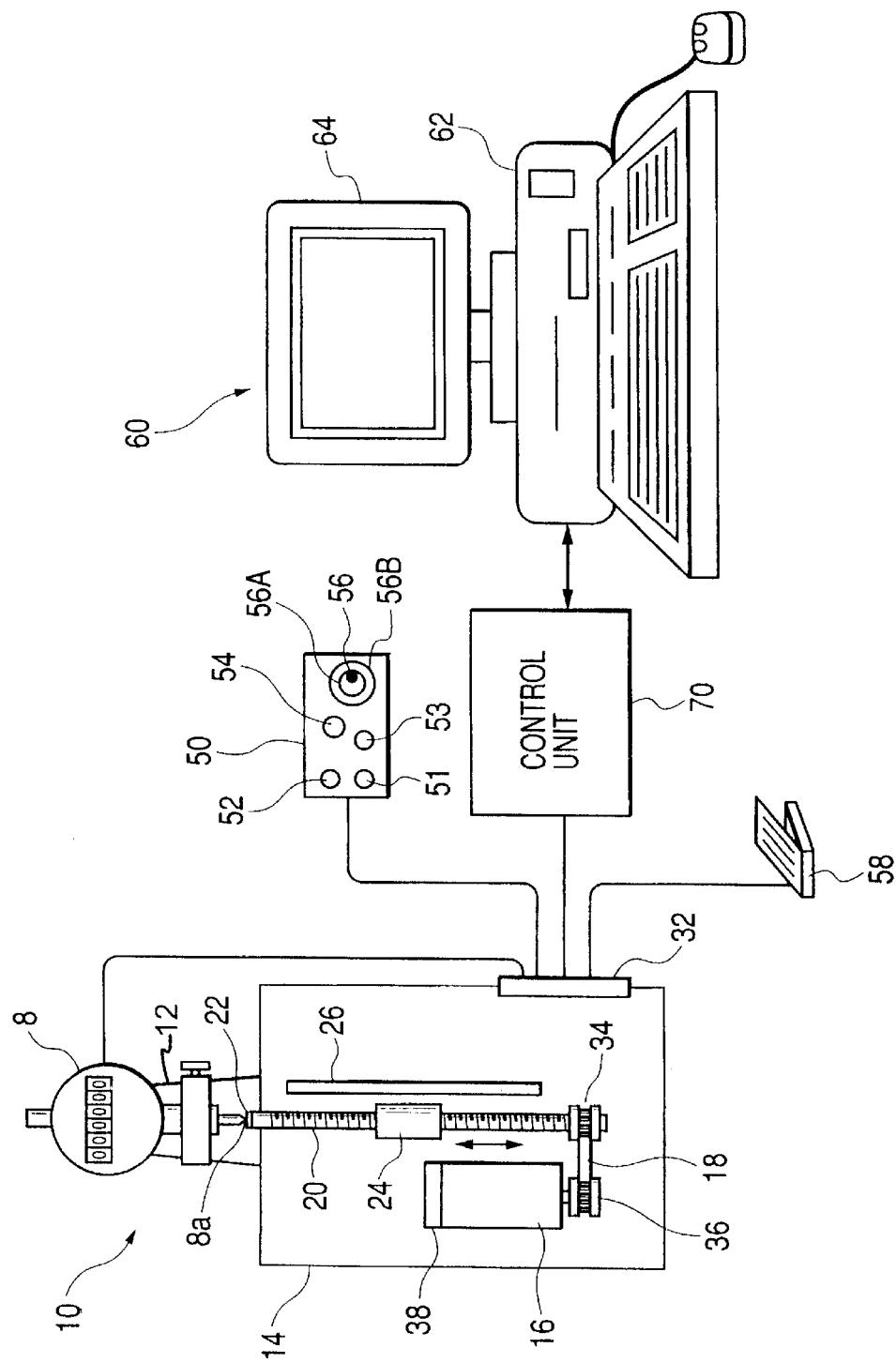
FIG. 1 is a diagram illustrating an overall configuration of a dial gage inspecting apparatus which is one example of an object of application of the invention.

As shown in FIG. 1, a dial gage inspecting apparatus to which the invention is applied is, if largely classified, comprised of an inspecting apparatus body 10, an operation box 50, and a data processor 60.

Figure 12:
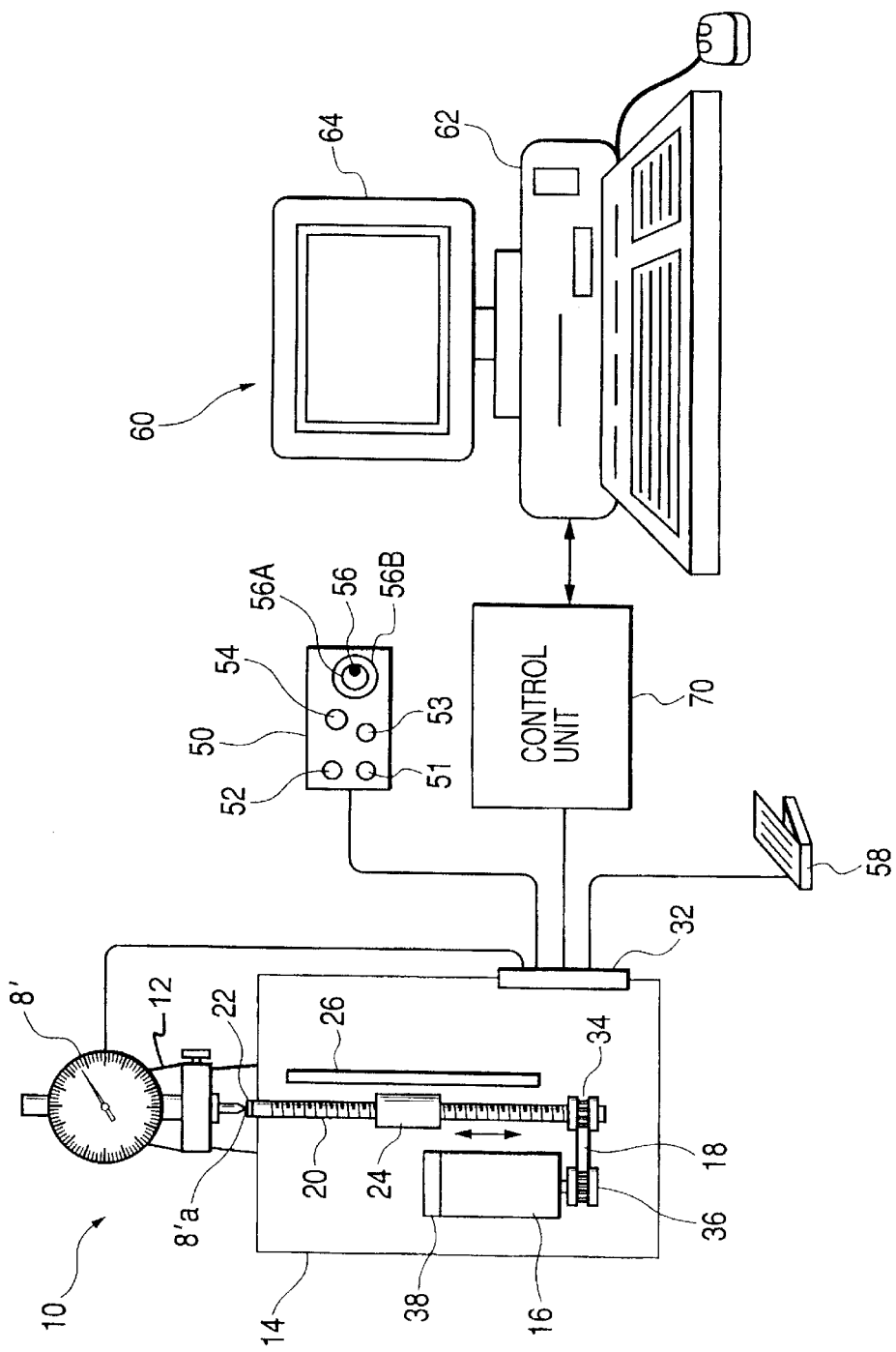
FIG. 12 is a diagram illustrating an overall configuration of a dial gage inspecting apparatus with an analog-display dial gage which is another example of an object of application of the invention.

The inspecting apparatus body 10 has. a housing 14 having a holder 12 attached to an upper surface thereof. The holder 12 fixes a digital-display dial gage 8 which is an object to be inspected. The dial gage may be an analog-display dial gage 8' as shown in FIG. 12.

A motor 16, a ball screw 20, a measuring spindle 22, an intermediate member 24, a scale 26 for height detection, and a relay board 32 are provided inside the housing 14. The ball screw 20 is rotatively driven by the motor 16 by means of a timing belt 18, and is movable in its axial direction. The measuring spindle 22 is provided on an upper end of the ball screw 20. The intermediate member 24 is attached approximately to the middle of the ball screw 20. The scale 26 for height detection is provided in such a manner as to oppose the moving range of the intermediate member 24. A plurality of signal lines from the motor 16 and the like are gathered at the relay board 32.

The ball screw 20 is threadedly engaged with a nut 34 attached to its lower end portion. The ball screw 20 is axially supported in such a manner as to be rotatable relative to the nut 34 and axially movable. The outer portion of the nut 34 is formed as a wheel. A wheel 36 is attached to an output shaft of the motor 16. The aforementioned timing belt 18 is trained between the wheel of the nut 34 and the wheel 36. The rotational power of the motor 16 is transmitted to the ball screw 20 by means of this timing belt 18. The ball screw 20 is provided with a detent, and as the rotational power of the motor 16 is transmitted to the ball screw 20, the ball screw 20 moves in the axial direction (in the heightwise direction) corresponding to the amount of rotation of the motor 16.

A light source such as a light-emitting diode and a light-receiving element such as a photo cell (neither are shown) are attached to that surface of the intermediate member 24 which opposes the scale 26. By means of this light-receiving element, the intermediate member 24 detects the reflected light from the scale 26. The detection signal from the light-receiving element is subjected to waveform shaping by a preamplifier (not shown), and is then outputted to an external circuit through the relay board 32. The detection signal outputted to the external circuit is used for specifying the position (height) of the measuring spindle 22.

A tachogenerator (TG) 38 is pivotally supported by the motor 16. A speed signal from the tachogenerator (TG) 38 is outputted to the external circuit through the relay board 32. The speed signal outputted to the external circuit is used for detecting the rotational speed of the motor 16.

In the inspecting apparatus body 10 having the above-described configuration, when a drive signal is imparted to the motor 16 through the relay board 32, the motor 16 rotates. Its driving force is transmitted to the nut 34 by means of the timing belt 18, which in turn causes the ball screw 20 to start moving in the axial direction. When the measuring spindle 22 reaches a designated position (the starting position of measurement), the movement of the measuring spindle 22 stops, thereby assuming a state for starting the inspection of the dial gage 8. The position of the measuring spindle 22 at this time is specified on the basis of an output signal from the light-receiving element attached to the intermediate member 24.

Then, as the measuring spindle 22 is moved by a predetermined amount in accordance with a predetermined inspection procedure, and thereby a gage tip 8a is pressed and moved, the inspection of the dial gage 8 is performed.

The operation box 50 is operated by a user. The operation box 50 is connected to the relay board 32'. Provided on the front surface of the operation box 50 are a data input button 51, a retry button 52, a cancel button 53, a motor stop button 54, and a jog shuttle 56. The data input button 51 is a button for fetching a measured value of the measuring spindle 22. The. retry button 52 is a button for retrying the present measurement. The cancel button 53 is a button for canceling an immediately previous measured value. The motor stop button 54 is a button for emergency stopping the motor 16 for driving the measuring spindle 22. The jog shuttle 56 is used to operate the vertical movement of the measuring spindle 22. Further, a foot switch 58 having the same function has that of the data input button 51 is also connectable to the relay board 32,. as required.

A jog dial 56A on the inner side of the jog shuttle 56 is for controlling the amount of displacement of the measuring spindle 22 when the position of the measuring spindle 22 is finely adjusted. A pulse generator such as a rotary encoder is connected to the jog dial 56A. The measuring spindle 22 is driven by an amount of movement proportional to the amount of pulse generated by the pulse generator. Here, the pulse rate for defining the amount of movement per pulse is made capable of being set from a personal computer 62 which will be described later, in correspondence with the scale interval of the gage.

A shuttle ring 56B on the outer side of the jog shuttle 56 is for controlling the driving direction and driving speed of the measuring spindle 22 when the position of the measuring spindle 22 is roughly adjusted. The shuttle ring 56B is rotatable through, for example, about ±80° with respect to an intermediate position to which the shuttle ring 56B can be automatically returned by a spring (not shown). Further, an encoder or a potentiometer for detecting the angle of rotation of the shuttle ring 56B is connected to the shuttle ring 56B. The driving direction of the measuring spindle 22 is then controlled in correspondence with the direction of rotation of the shuttle ring 56B from its central position. In addition, the measuring spindle 22 is driven at a speed proportional to the angle of rotation of the shuttle ring 56B. The rate of the speed is made capable of being set in correspondence with the scale interval of the gage.

The control mode using the jog shuttle 56 is made capable of being changed over between a high speed mode and a slow speed mode which are described below, by the personal computer 62.

The high speed mode is a control mode which is independent of the scale interval of the gage, and in terms of the pulse rate of the jog dial 56A, the amount of movement of the measuring spindle 22 per, for example, ¼ rotation is set to one scale interval (e.g., 10 μm) of the gage which is relatively rough. The speed rate of the shuttle ring 56B is set to become a maximum speed (e.g., 4 mm/sec) of the inspecting apparatus when the angle of rotation of the shuttle ring 56B is maximum.

Meanwhile, the low speed mode is a control mode which is dependent of the scale interval of the gage, and in terms of the pulse rate of the jog dial 56A, the amount of movement of the measuring spindle 22 per, for example, ¼ rotation is set to the scale interval of the gage being measured. The speed rate of the shuttle ring 56B is set to be a speed, for example, at which the needle of the gage undergoes one rotation per second when the angle of rotation of the shuttle ring 56B is maximum in the case of the analog-display dial gage 8' shown in FIG. 12.

Further, at the time of the setup of inspection including the adjustment of a reference position of measurement, a changeover can be freely made between the high speed mode and the low speed mode, thereby permitting speedy setup.

On the other hand, during measurement (at the time of scale adjustment), the jog dial 56A is fixed at the low speed mode, and an instruction for moving the jog dial 56A in an opposite direction to the measuring direction is made invalid. Accordingly, the measuring spindle is prevented from moving in the opposite direction to the measuring direction due to an erroneous operation during measurement. Consequently, the retrial of the measurement due to the effect of hysteresis or the like can be prevented. In addition, the operation of the shuttle ring 56B for high-speed movement to the vicinity of the measurement position is made invalid.

The data processor 60 is configured by a general-purpose personal computer system, for example, and has the personal computer 62 and a display unit 64. On a PCI bus inside the personal computer 62 of the data processor 60, for example, a control unit 70 which is connected to the inspecting apparatus body 10 is mounted as a board. In FIG. 1, a state in which the control unit 70 is removed from the personal computer 62 is shown to facilitate the understanding of the control unit 70.

Figure 2:
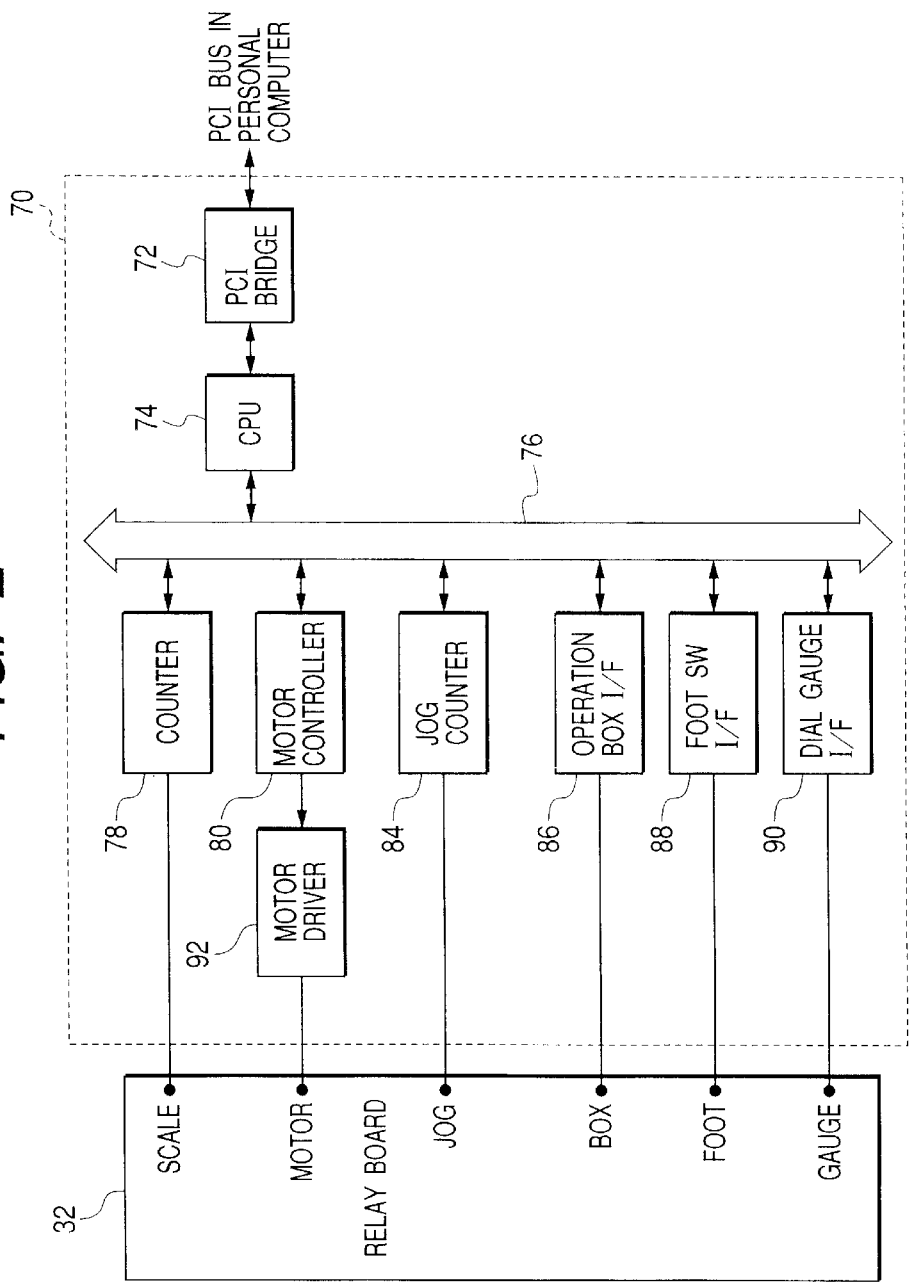
FIG. 2 is a block diagram illustrating a detailed configuration of a control unit shown in FIG. 1.

As shown in detail in FIG. 2, the control unit 70 is provided with a PCI bridge 72, a CPU 74, a counter 78, a motor controller 80, a jog counter 84, an operation box I/F 86, a foot switch I/F 88, a dial gage I/F 90, and the like. The PCI bridge 72 is connected to the PCI bus of the personal computer 62. The CPU 74 is connected to the PCI bridge 72 to control the inspection machine body 10. The counter 78 is connected to a bus 76 in the control section 70. The dial gage I/F 90 is used to input a measured value of the dial gage.

The CPU 74 is constituted by a one-chip microcomputer incorporating a ROM, a RAM, and the like. A motor driver 92 is connected to an output side of the motor controller 80. An output side of the motor driver 92 is connected to the motor 16 via a motor (MOTOR) terminal of the relay board 32. The motor controller 80 outputs a speed command (control pulse signal) for driving the motor 16 to the motor driver 92 in accordance with a command value corresponding to the position of the measuring spindle 22 sent from the CPU 74.

The counter 78 receives an output signal from the light-receiving element subjected to waveform shaping by the preamplifier (not shown) which is sent via a scale (SCALE) terminal of the relay board 32, and counts it to specify the position of the measuring spindle 22.

The jog counter 84 is connected to the jog dial 56A of the operation box 50 via a jog (JOG) terminal of the relay board 32.

The operation box I/F 86 is connected to the shuttle ring 56B, the buttons 51 to 54, and the like o the operation box 50 via an operation box (BOX) terminal of the relay board 32. In addition, the PCI bridge 72 is a circuit for interconnecting the PCI bus.

Figure 3:
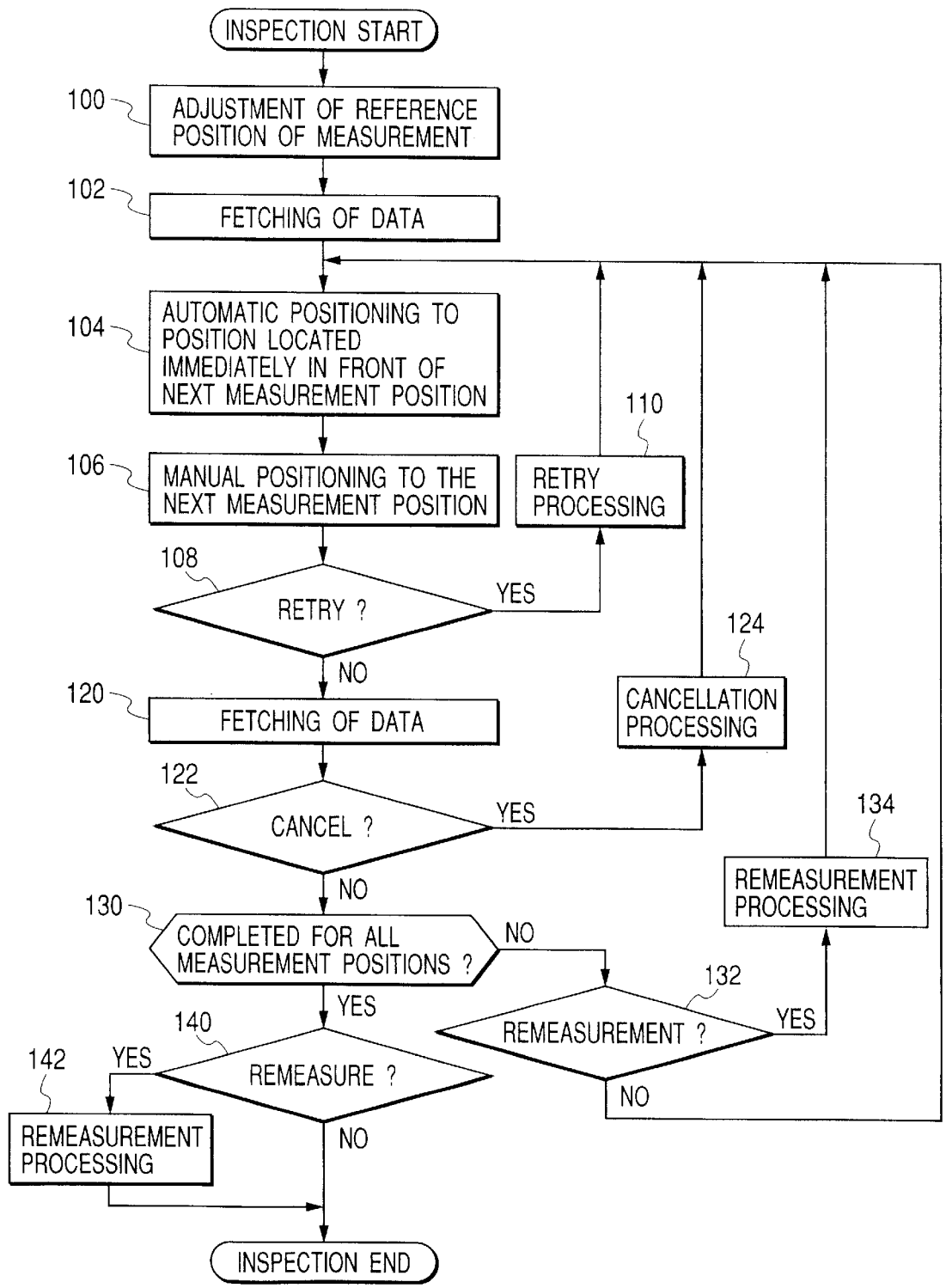
FIG. 3 is a flowchart illustrating the overall processing procedure in accordance with an embodiment of the invention.

The measurement in accordance with the invention using the above-described dial gage inspecting apparatus is performed in accordance with a procedure shown in FIG. 3.

Namely, first, in Step 100, after the start of inspection, the position of the measuring spindle 22 is adjusted by means of the jog shuttle 56 while observing the displayed value of the dial gage 8 so that the displayed value becomes the reference position of measurement (an initial measurement position; normally a zero point). Specifically, after the position of the measuring spindle 22 is first moved at the high speed by the shuttle ring 56B, fine adjustment is made by the jog dial 56A such that the displayed value of the dial gage is exactly set at the starting point of measurement.

Next, in Step 102, measurement data on the measuring spindle 22 is inputted by pressing the data input button 51 or the foot switch 58, completing the adjustment of the reference position of measurement.

Next, in Step 104, the measuring spindle 22 is driven and advanced forwardly at the high speed by the motor 16, and is automatically positioned to a position located in front of the next measurement position by leaving the portion of approaching distance for approaching the next measurement position. At this time, the approaching distance for manually moving the measuring spindle 22 at the low speed exactly to the next measurement position can be set from the personal computer 62.

Next, in Step 106, by manually driving the measuring spindle 22 by using the jog shuttle 56, manual positioning (scale adjustment) is effected so that the displayed value of the dial gage 8 is set exactly to the next measurement position.

At this time in the invention, the jog dial 56A is fixed to the low speed mode, and an instruction for operating the jog dial 56A in the opposite direction to the measuring direction is made invalid, while the operation of the shuttle ring 56B is also made invalid. Accordingly, thanks to the jog dial 56A which is fixed to the low speed mode, there is no apprehension for erroneously operating the jog dial 56A in the opposite direction to the measuring direction, and scale adjustment can be effected slowly.

Thus, since the control mode (the low speed mode in the embodiment) which is dependent on the scale interval of the gage is made selectable by the jog shuttle 56, even if gages having different scale intervals are inspected, the adjust of the scale of the gage becomes possible with the same operating feeling.

In addition, during measurement for scale adjustment, the jog dial 56A is fixed to the low speed mode, and an instruction for the opposite direction to the measuring direction and the instruction o the shuttle ring 56B are made invalid, so that the function is limited. Accordingly, it is possible to prevent an erroneous operation by the operator.

Figure 4:
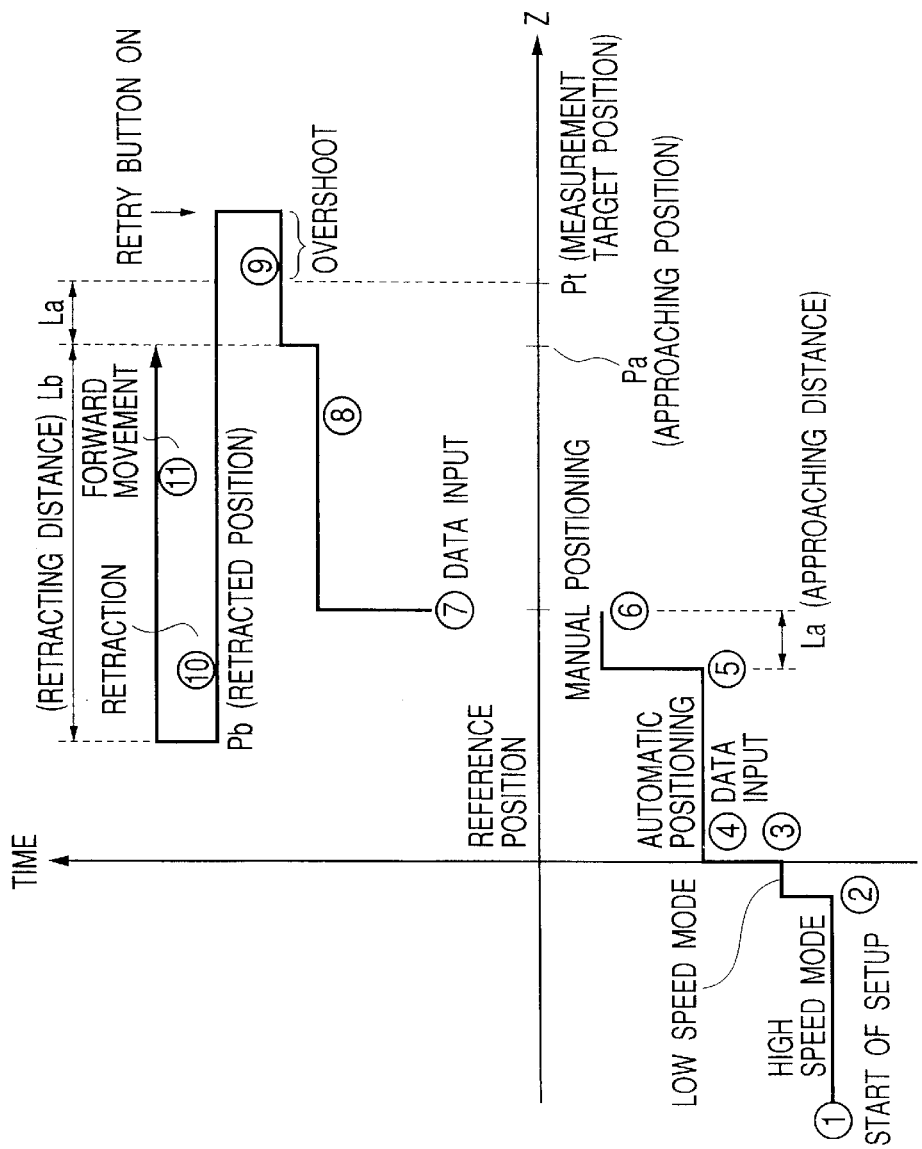
FIG. 4 is a time chart illustrating the manner of retry processing in accordance with the embodiment.

Here, for example, when the jog dial 56A has been excessively turned and overshot the measurement position, and a need has arisen to perform the present measurement again and the retry button 52 has been pressed, the operation proceeds from Step 108 to Step 110. As shown in FIG. 4, after the measuring spindle 22 is temporarily retracted by the motor to a retracted position Pb where the effect of the hysteresis on the gage can be eliminated, the measuring spindle 22 is advanced forwardly again to the approaching position Pa. Then, the approach processing to the measurement position is performed manually.

Figure 5:
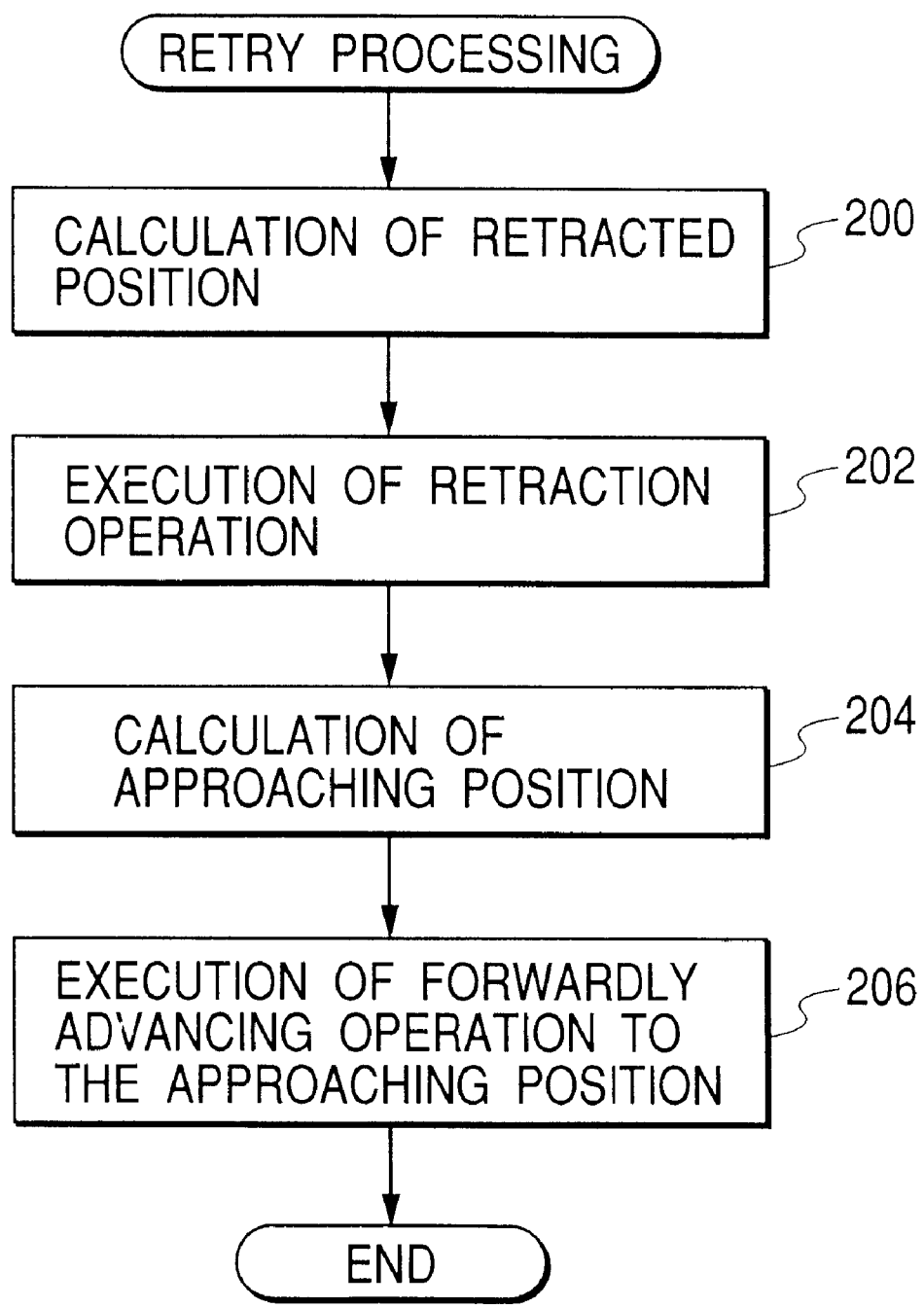
FIG. 5 is a flowchart illustrating the procedure of the retry processing.

Specifically, as the procedure of retry processing is shown in FIG. 5, the retracted position is first calculated in Step 200. Specifically, at the time of measurement in a forwardly advancing stroke, a value obtained by subtracting an approaching distance La and a retraction distance Lb from a measurement target position Pt is set as the retracted position Pb as shown in the following Formula (1):

$$Pb = Pt - La - Lb \qquad (1)$$

Meanwhile, at the time of measurement in a return stroke, a value obtained by adding the approaching distance La and the retraction distance Lb to the measurement target position Pt is set as the retracted position Pb as shown in the following Formula (2):

$$Pb=Pt+La+Lb \qquad (2)$$

Here, the approaching distance La and the retraction distance Lb can be designated from the personal computer 62, for example. In addition, if an arrangement is provided such that the designation is given not in the actual unit of length but in the unit of the scale of the gage, the same values can be used for gages of various scale specifications.

Next, the operation proceeds to Step 202 to execute the retraction operation by the motor so as to effect the automatic positioning of the measuring spindle 22 to the retracted position Pb.

Next, the operation proceeds to Step 204 to calculate the approaching position Pa which becomes a target for forwardly advancing the measuring spindle 22 by the motor. Specifically, at the time of measurement in the forwardly advancing stroke, a value obtained by subtracting the approaching distance La from the measurement target position Pt is set as the approaching position Pa as shown in the following Formula (3):

$$Pb=Pt-La \qquad (3)$$

Meanwhile, at the time of measurement in the return stroke, a value obtained by adding the approaching distance La and to the measurement target position Pt is set as the approaching position Pa as shown in the following Formula (4):

$$Pb=Pt+La \qquad (4)$$

Next, in Step 206, the operation of forwardly advancing the measuring spindle 22 to the approaching position Pa by the motor is executed, and after the automatic positioning to the approaching position is carried out, the retry processing ends.

After the manual positioning including a retrial, which is carried out as necessary is completed, in Step 120, the data input button 51 or the foot switch 58 is pressed to fetch the measurement data on the measuring spindle 22.

Figure 6:
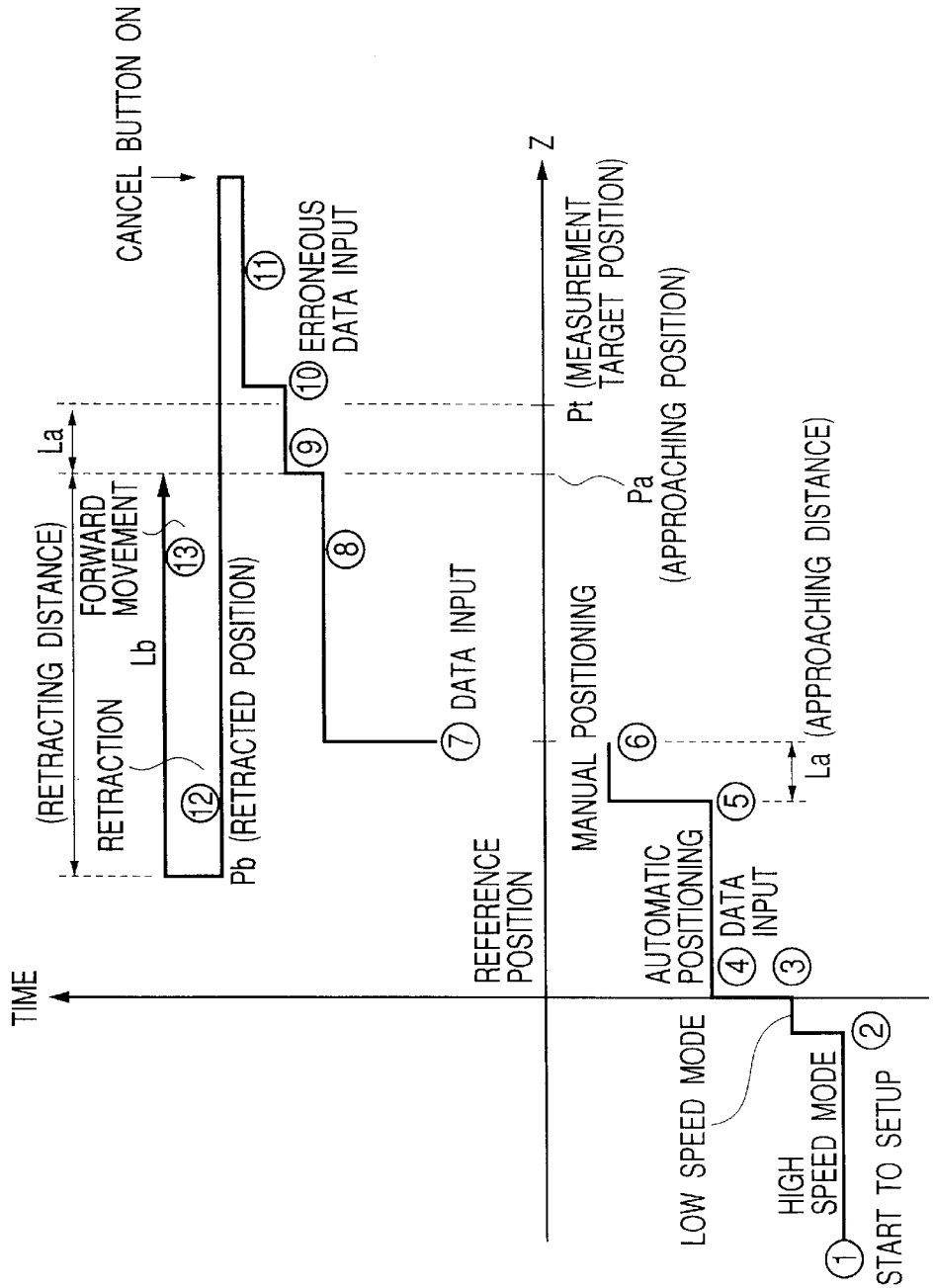
FIG. 6 is a time chart illustrating the manner of cancellation processing.

If the cancel button 53 has been pressed when the operator has become aware of an erroneous input of data after fetching the data, the operation proceeds from Step 122 to Step 124. Then, as shown in FIG. 6, the result of the immediately previous measurement is deleted so that the measurement target position corresponding to the deleted measurement point can be remeasured.

Figure 7:
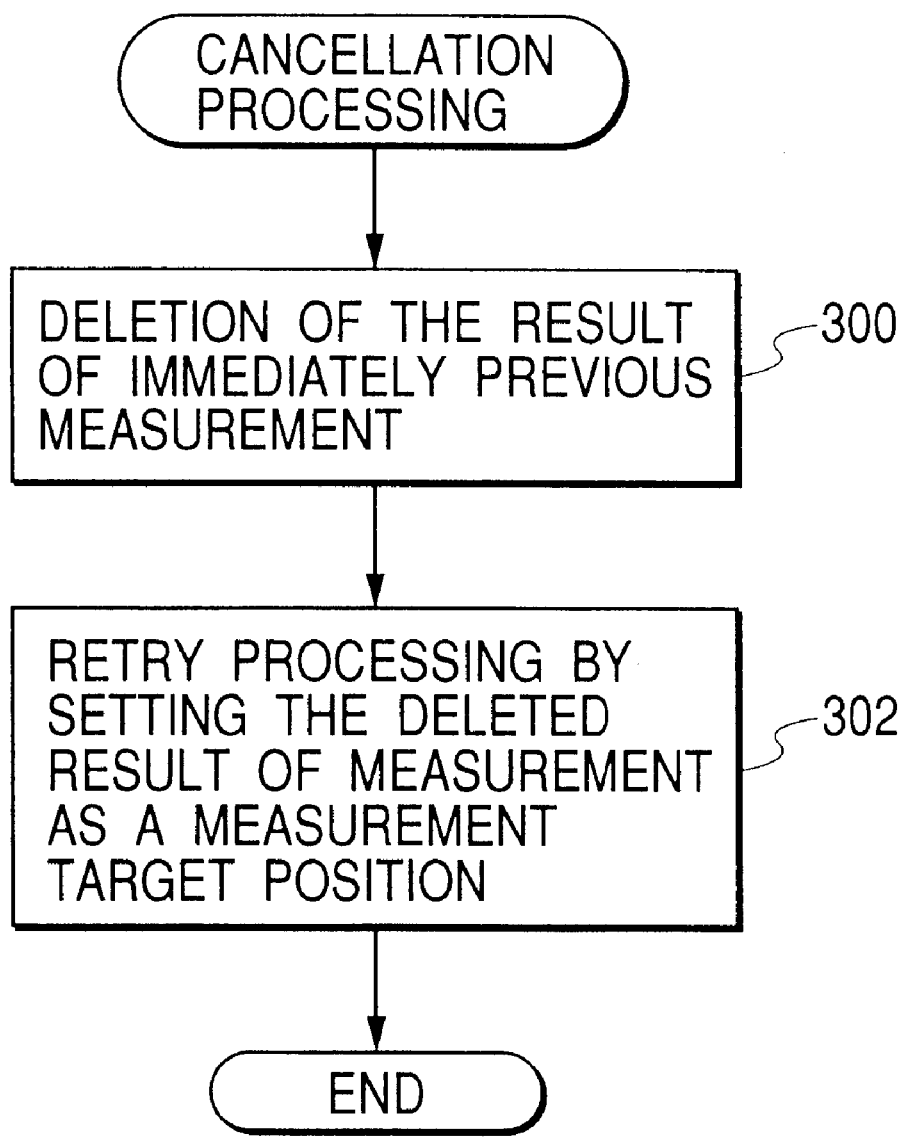
FIG. 7 is a flowchart illustrating the procedure of the cancellation processing.

Specifically, as shown in FIG. 7, the result of the immediately previous measurement is first deleted in Step 300.

Next, the operation proceeds to Step 302 in which the above-described retry processing is carried out by setting as Pt the measurement target position corresponding to the deleted measurement point.

Figure 8:
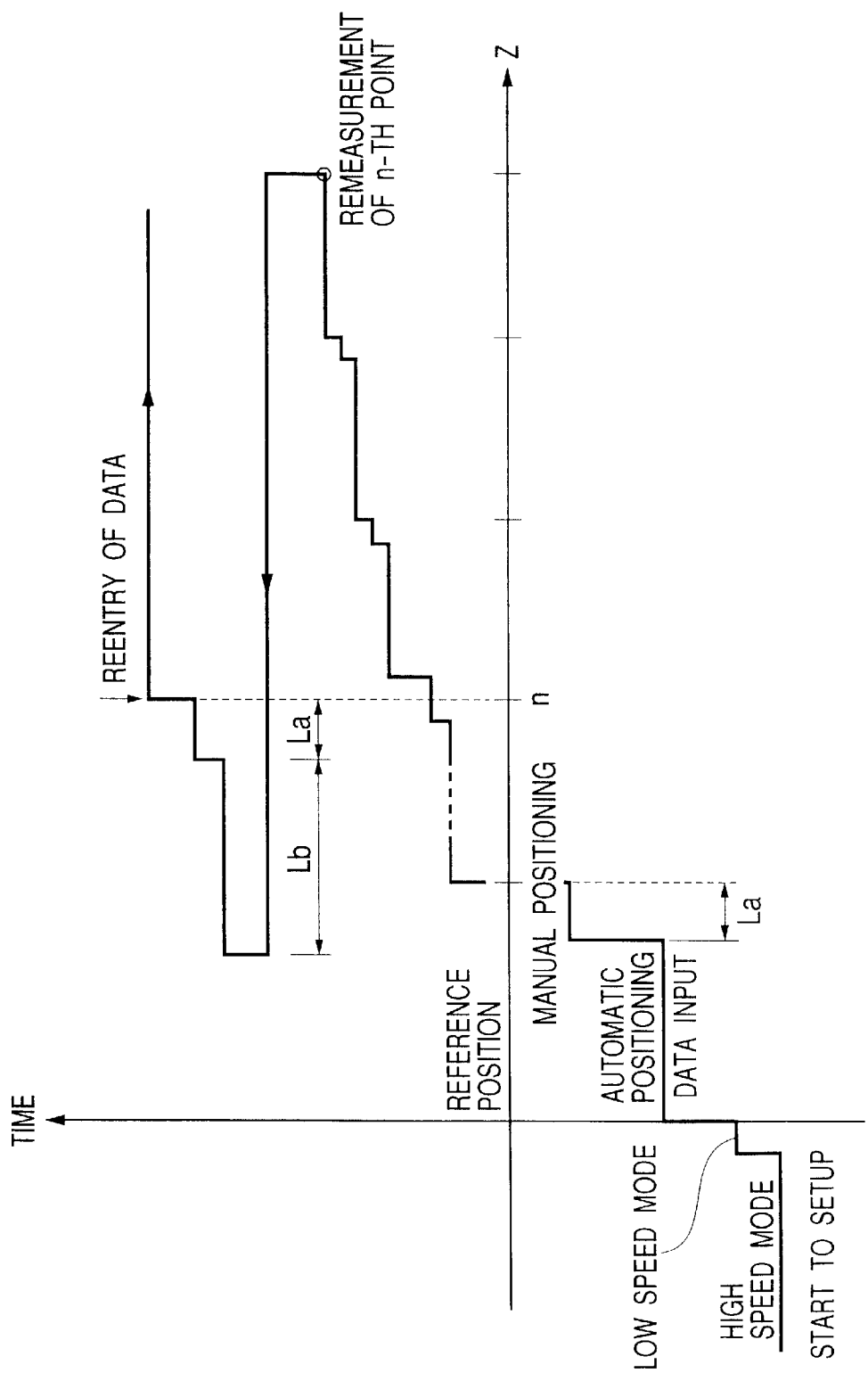
FIG. 8 is a time chart illustrating the manner of remeasurement.

Further, when during measurement the operator has become aware of the fact that arbitrary measurement data which was measured several points before is inappropriate, and has instructed remeasurement through, for example, the personal computer 62, the operation proceeds from Step 132 to Step 134. Then, as shown in FIG. 8, after processing for remeasurement is carried out, the present measurement is resumed.

Figure 9:
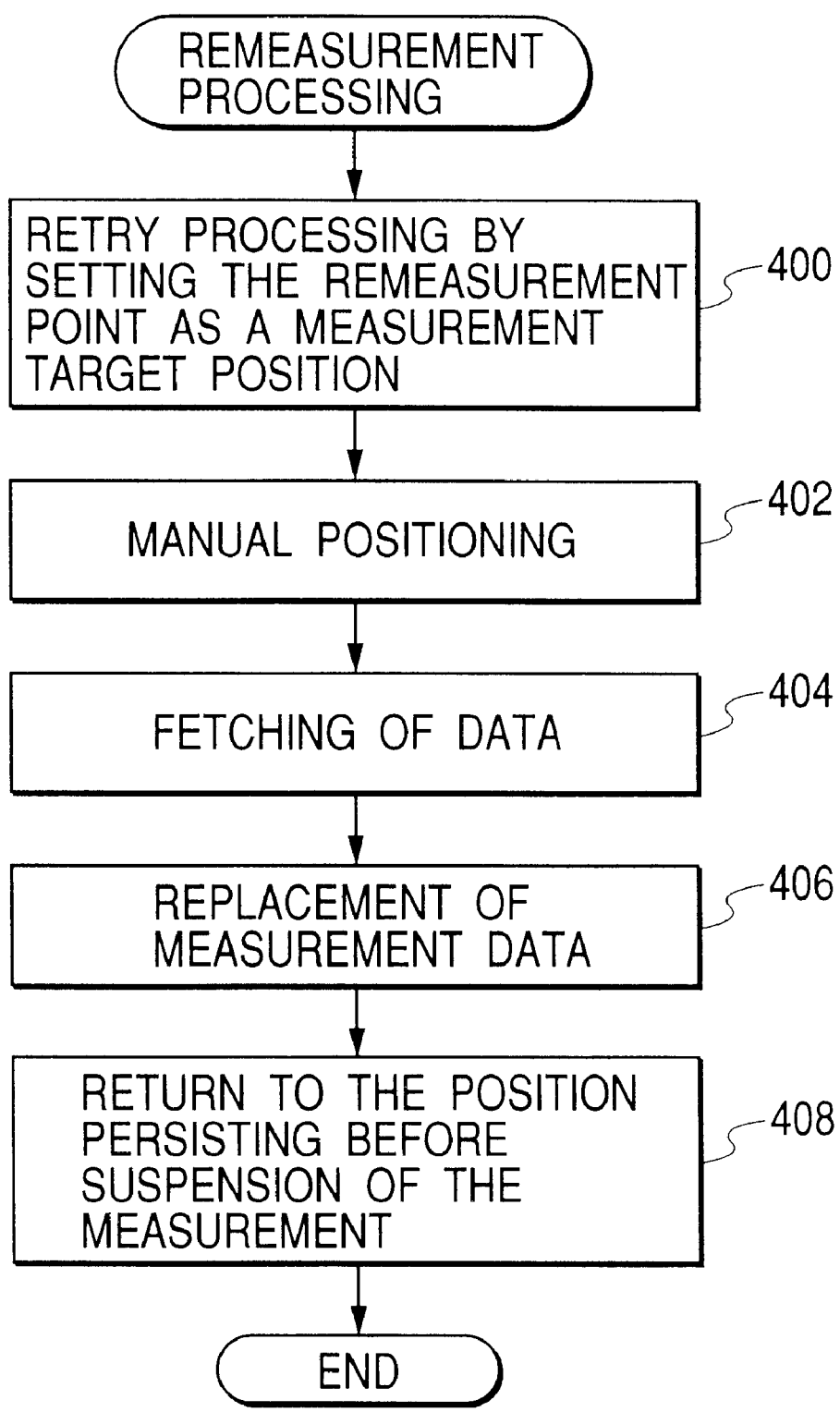
FIG. 9 is a flowchart illustrating the procedure of remeasurement processing.

Specifically, as shown in FIG. 9, in Step 400, the above-described retry processing is first carried out by setting the target position of the remeasurement point as Pt.

Next, the operation proceeds to Step 402 to manually effect the scale adjustment of the displayed value of the gage by using the jog shuttle 56. At this time, if the retry button 52 is pressed, the above-described retry processing is automatically effected, and remeasurement processing is subsequently resumed.

After completion of the manual position in Step 402, in Step 404, the data input button 51 or the foot switch 58 is pressed to fetch the measurement data on the measuring spindle 22.

Next, the operation proceeds to Step 406 to replace the measurement data. Next, the operation proceeds to Step 408 to return the measuring spindle 22 to the position persisting before the suspension of measurement for remeasurement, and the remeasurement processing ends.

Upon completion of Step 120, the operation proceeds to Step 130, and the above-described operation is repeated until measurement for all measurement positions is completed.

Figure 10:
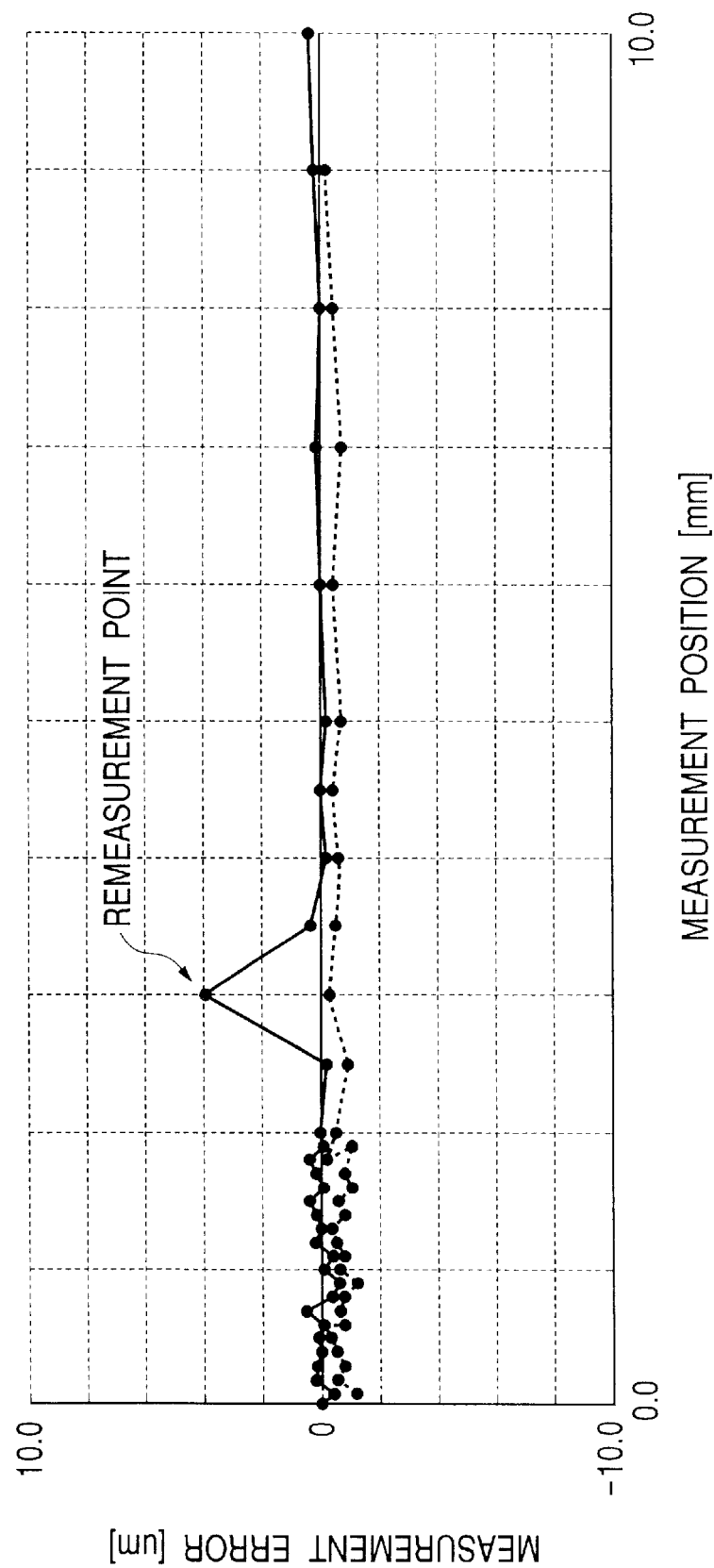
FIG. 10 is a diagram illustrating an example of results of measurement including measurement points for which remeasurement are required.

An example of the results of measurement is shown in FIG. 10. As shown in FIG. 10, if points for which remeasurement is considered necessary are present such as when an error of a reading on the gage with respect to a reading on the inspecting apparatus exceeds an allowable range, the operator, for instance, inputs from the personal computer points to be remeasured to allow the operation-to proceed from Step 140 to Step 142 to execute remeasurement. It should be noted that, in this case, Step 408 shown in FIG. 9 is not executed.

Figure 11:
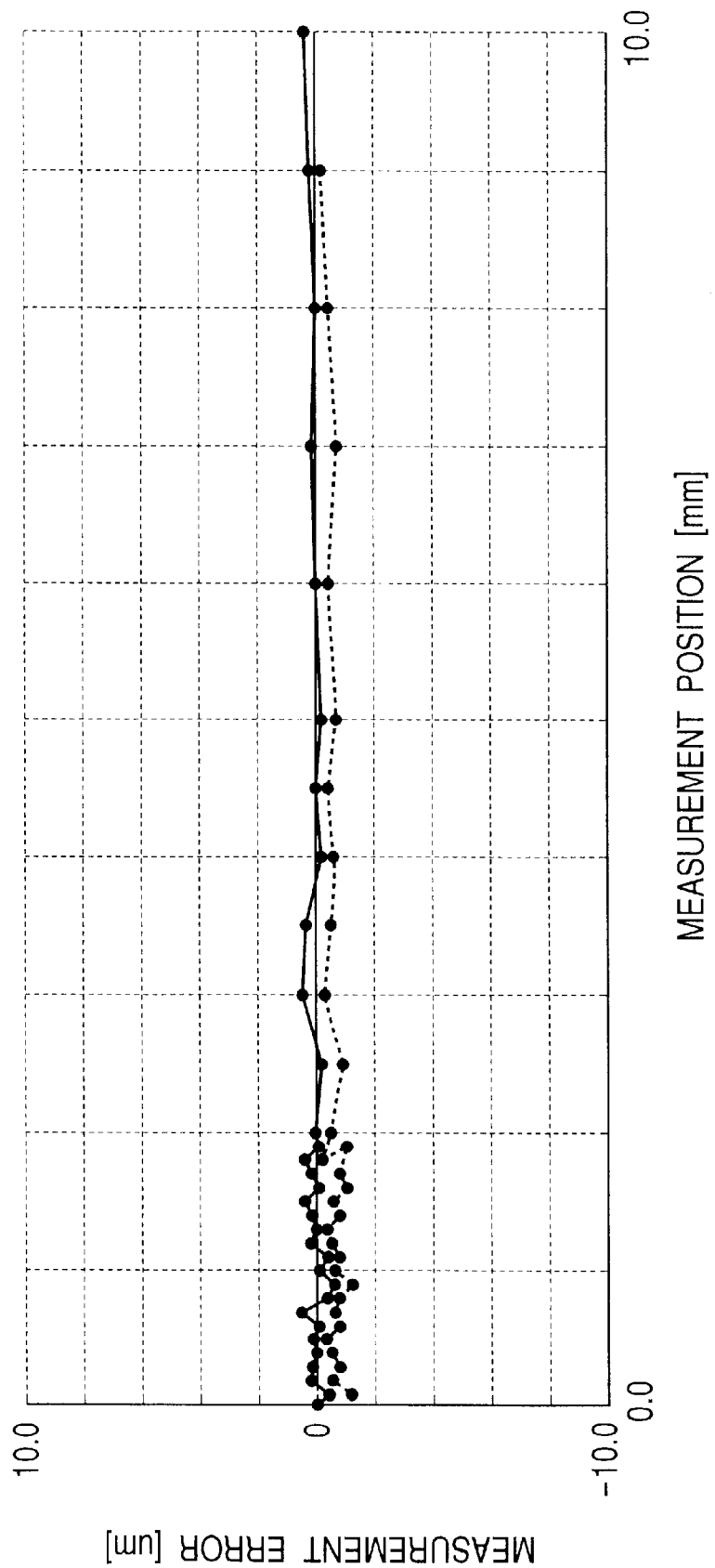
FIG. 11 is a diagram illustrating an example of results of measurement after the remeasurement.

As shown in FIG. 11, there are cases where satisfactory results of measurement can be obtained by performing remeasurement in this manner.

It should be noted that the selection of a remeasurement point may be determined by the operator after examining the result of measurement. In addition, when the error of a reading on the gage with respect to a reading on the inspecting apparatus has exceeded an allowable range, an alarm may be issued to prompt the operator to effect remeasurement. Alternatively, the measuring spindle may be automatically driven to a position located immediately in front of a position for effecting manual positioning in which a measurement point for which the error exceeded the allowable range is set as the measurement target position, thereby setting the measuring spindle on standby.

Thus, by simply pressing the retry button or the cancel button, the measuring spindle is automatically driven to a position located immediately in front-of a position for retrying the present measurement or to a position located immediately in front of a position for remeasuring the immediately previous measurement, thereby making it possible to easily recover the operator's operation error.

It should be noted that although in the above-described embodiment the invention is applied to the dial gage inspecting apparatus, the applicable object of the invention is not limited to the same, and it goes without saying that the invention is similarly applicable to the inspection of any mechanical or digital displayed indicators other than dial gages.

In accordance with the invention, the operational efficiency at the time of inspecting the gage improves, and it becomes possible to inspect a multiplicity of gages in a short time.

In addition, in accordance with the invention, the operator's operation error can be recovered speedily. Accordingly, outstanding advantages are offered in that the inspection time can be reduced, that the operator's fatigue can be mitigated, and that measurement errors can be decreased.

What is claimed is:

1. A gage inspecting apparatus comprising:
   a measuring member which is made to abut against a probe of an object to be inspected;
   a detecting unit for detecting the indication accuracy of the object to be inspected on the basis of an indicated value of the object to be inspected and a measured value of said measuring member at a time when
   said measuring member is displaced to a predetermined position; and
   a control unit having a jog shuttle for manually adjusting the position of said measuring member and capable of operating said gage inspecting apparatus.

2. The gage inspecting apparatus according to claim 1, wherein said jog shuttle includes a jog dial for controlling an amount of displacement of said measuring member, and a shuttle ring for controlling a driving direction and a driving speed of said measuring member.

3. The gage inspecting apparatus according to claim 2, wherein a relationship between an amount of rotation of said jog dial and the amount of displacement of said measuring member is set in correspondence with a scale interval of the object to be inspected.

4. The gage inspecting apparatus according to claim 2, wherein the driving direction of said measuring member is controlled in correspondence with a direction of rotation of said shuttle ring from an intermediate position thereof, and said measuring member is driven at a speed proportional to an angle of rotation from the intermediate position of said shuttle ring.

5. The gage inspecting apparatus according to claim 3, wherein the driving direction of said measuring member is controlled in correspondence with a direction of rotation of said shuttle ring from an intermediate position thereof, and said measuring member is driven at a speed proportional to an angle of rotation from the intermediate position of said shuttle ring.

6. The gage inspecting apparatus according to claim 2, wherein said control unit includes a high speed mode which is independent of a scale interval of the object to be inspected and in which said measuring member is displaced by a large amount by a small amount of rotation of said jog dial and a maximum driving speed of said measuring member can be set by said shuttle ring, and a low speed mode which is dependent of the scale interval of the object to be inspected and in which said measuring member is displaced by a small amount by a large amount of rotation of said jog dial and the maximum driving speed of said measuring member cannot be set even by a maximum angle of rotation of said shuttle ring.

7. The gage inspecting apparatus according to claim 6, wherein at the time of the setup of inspection, a changeover is freely possible between the high speed mode and the low speed mode, and wherein, during measurement, said jog dial is fixed to the low speed mode, and an instruction for displacing said jog dial in an opposite direction to a measuring direction and an instruction based on said shuttle ring are made invalid.

8. The gage inspecting apparatus according to claim 1, further comprising:
   an instructing portion provided in said control unit to instruct remeasurement of the measured value of said measuring member; and
   an automatic positioning unit which when the remeasurement has been instructed, causes said measuring member to be temporarily retracted to a position where a hysteresis of the object to be inspected can be avoided, and causes said measuring member to be subsequently advanced forwardly to a position located immediately in front of a measurement target position of the measured value for which remeasurement has been instructed.

9. The gage inspecting apparatus according to claim 8, wherein said instructing portion instructs the retrial of the present measurement, and when the retrial has been instructed, said automatic positioning unit causes said measuring member to be temporarily retracted to the position where the hysteresis of the object to be inspected can be avoided, and causes said measuring member to be subsequently advanced forwardly to a position located immediately in front of a present measurement target position.

10. The gage inspecting apparatus according to claim 8, wherein said instructing portion instructs the deletion of a result of immediately previous measurement, and when the deletion has been instructed, said automatic positioning unit causes said measuring member to be temporarily retracted to the position where the hysteresis of the object to be inspected can be avoided, and causes said measuring member to be subsequently advanced forwardly to a position located immediately in front of
   the measurement target position of an immediately previous measurement point.

11. The gage inspecting apparatus according to claim 8, wherein said instructing portion instructs the remeasurement of the measured result of measurement, and when the remeasurement has been instructed, said automatic positioning unit causes said measuring member to be temporarily retracted to the position where the hysteresis of the object to be inspected can be avoided, and causes said measuring member to be subsequently advanced forwardly to a position located immediately in front of the measurement target position of a measurement point for which remeasurement has been instructed.

12. The gage inspecting apparatus according to claim 8, wherein a retraction distance and a forwardly approaching distance by said automatic positioning unit can be designated.

13. The gage inspecting apparatus according to claim 8, wherein said jog shuttle includes a jog dial for controlling an amount of displacement of said measuring member, and a shuttle ring for controlling a driving direction and a driving speed of said measuring member.

14. A method of inspecting a gage using a gage inspecting apparatus which has a measuring member which is made to abut against a probe of an object to be inspected and a jog shuttle for adjusting a position of said measuring member, and which detects the indication accuracy of an object to be inspected on the basis of an indicated value of the object to be inspected and an amount of displacement of said measuring member at a time when said measuring member is displaced to a predetermined measurement position, the method comprising the steps of:
   manually positioning said measuring member by said jog shuttle so that the indicated value of the object to be inspected is set to a reference position of measurement;
   measuring the position of said manually positioned measuring member;
   automatically positioning said measuring member to a position located immediately in front of the measurement position by driving said measuring member;
   manually positioning said measuring member to the measurement position by means of said jog shuttle; and measuring the amount of displacement of said measuring member at the measurement position.

15. The method of inspecting a gage according to claim 14, further comprising the steps of:

instructing the retrial of the present measurement;

temporarily retracting said measuring member to a position where a hysteresis of the object to be inspected can be avoided when the retrial has been instructed; and subsequently forwardly advancing said measuring member to a position located immediately in front of a present measurement target position.

16. The method of inspecting a gage according to claim 14, further comprising the steps of:

instructing the deletion of a result of immediately previous measurement;

temporarily retracting said measuring member to a position where a hysteresis of the object to be inspected can be avoided when the deletion has been instructed; and subsequently forwardly advancing said measuring member to a position located immediately in front of a measurement target position of an immediately previous measurement point.

17. The method of inspecting a gage according to claim 14, further comprising the steps of:

instructing the remeasurement of a measured result of measurement;

temporarily retracting said measuring member to a position where the hysteresis of the object to be inspected can be avoided when the remeasurement has been instructed; and subsequently forwardly advancing said measuring member to a position located immediately in front of a measurement target position of a measurement point for which remeasurement has been instructed.

* * * * *

UNITED STATES PATENT AND TRADEMARK OFFICE
CERTIFICATE OF CORRECTION

PATENT NO.   : 6,510,725 B2
DATED        : June 28, 2003
INVENTOR(S)  : Zhang et al.

It is certified that error appears in the above-identified patent and that said Letters Patent is hereby corrected as shown below:

Column 6,
Line 4, delete "32" and insert -- 32 --.
Line 17, delete "32,." and insert -- 32, --.

Column 9,
Line 25, delete "Pb=Pt-La" and insert -- Pa=Pt-La --.
Line 30, delete "Pb=Pt+La" and insert -- Pa=Pt+La --.

Column 10,
Line 25, delete "operation-to" and insert -- operation to --.
Line 46, delete "front-of" and insert -- front of --.

Signed and Sealed this

Twenty-fifth Day of March, 2003

JAMES E. ROGAN
*Director of the United States Patent and Trademark Office*